US008910271B2

(12) United States Patent  
Rajadurai et al.

(10) Patent No.: US 8,910,271 B2
(45) Date of Patent: Dec. 9, 2014

(54) SYSTEM AND METHOD FOR HANDOVER BETWEEN INTERWORKING WLAN AND EUTRAN ACCESS SYSTEMS

(75) Inventors: Rajavelsamy Rajadurai, Bangalore (IN); Venkateswar Jeedigunta, Bangalore (IN); Rahul Suhas Vaidya, Bangalore (IN); O-Sok Song, Gyeonggi-do (KR); Sung-Ho Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1929 days.

(21) Appl. No.: 13/635,213

(22) PCT Filed: Oct. 27, 2006

(86) PCT No.: PCT/KR2006/004417
§ 371 (c)(1),
(2), (4) Date: Sep. 14, 2012

(87) PCT Pub. No.: WO2007/049936
PCT Pub. Date: May 3, 2007

(65) Prior Publication Data
US 2013/0042304 A1    Feb. 14, 2013

(30) Foreign Application Priority Data
Oct. 27, 2005    (IN) .......................... 1562/CHE/2005

(51) Int. Cl.
  *H04L 29/06*    (2006.01)
  *H04W 36/00*    (2009.01)
  *H04W 88/06*    (2009.01)
  *H04W 12/06*    (2009.01)
(52) U.S. Cl.
  CPC ........... *H04L 63/0892* (2013.01); *H04W 88/06* (2013.01); *H04W 36/0022* (2013.01); *H04W 12/06* (2013.01)
  USPC .............................................. 726/14; 455/436
(58) Field of Classification Search
  CPC ..................... H04L 63/0892; H04W 36/0022
  USPC ......................................... 726/3, 14; 455/436
  See application file for complete search history.

(56) References Cited

U.S. PATENT DOCUMENTS

| 2002/0044552 A1* | 4/2002 | Vialen et al. .................. 370/389 |
| 2003/0018810 A1* | 1/2003 | Karagiannis et al. ......... 709/238 |

(Continued)

OTHER PUBLICATIONS

Yen-Chieh Ouyang et al., "A Handoff Authentication and Key Agreement Scheme for Integration of UMTS and 802.11 WLANs", 2004.

(Continued)

Primary Examiner — Kambiz Zand
Assistant Examiner — Michael Guirguis
(74) Attorney, Agent, or Firm — The Farrell Law Firm, P.C.

(57) ABSTRACT

This invention relates to the area of Mobility and Handover between heterogeneous wireless networks. The scope of the invention also covers the case when the UE is capable of accessing both the WLAN and EUTRAN access systems simultaneously and also the case where the UE is not capable of accessing both the WLAN and EUTRAN access systems simultaneously. This invention provides a system and method to perform Mobility between the access systems with optimized authentication procedure using security context transfer between the access systems and also minimize the data loss by buffering the data during the handover. More specifically, this invention provides a system and method to support handover between the I-WLAN and the EUTRAN access systems.

28 Claims, 6 Drawing Sheets

(56) References Cited

U.S. PATENT DOCUMENTS

| | | | |
|---|---|---|---|
| 2004/0087307 A1* | 5/2004 | Ibe et al. | 455/436 |
| 2006/0104262 A1* | 5/2006 | Kant et al. | 370/352 |
| 2007/0204155 A1* | 8/2007 | Dutta et al. | 713/168 |

OTHER PUBLICATIONS

3G Mobile Communication Technologies 2004, Fifth IEEE international Conference, 2004.

M. Cappiello et al., "Mobility Amongst Heterogeneous Networks with AAA Support", Communication, 2001, IEEE International Conference, Apr. 28, 2002.

Hyun-Ho Choi et al., "A Seamless Handoff Scheme for UMTS-WLAN Interworking", GLOBECOM 04., IEEE, Nov. 29, 2004.

International Search Report dated Jan. 30, 2007 in a Counterpart application No. PCT/KR2006/004417.

* cited by examiner

SYSTEM AND METHOD FOR HANDOVER BETWEEN INTERWORKING WLAN AND EUTRAN ACCESS SYSTEMS

TECHNICAL FIELD

The present invention relates to the area of Mobility and Handover between heterogeneous wireless networks. More particularly, the present invention relates to a system and method to support handover between the I-WLAN and the EUTRAN access systems.

BACKGROUND ART

The Radio Access Network (RAN), System Architecture (SA) and the Core Terminal (CT) working groups of the third Generation Partnership Project (3GPP) aim to develop an Enhanced UTRAN (EUTRAN) architecture for next generation wireless systems. The EUTRAN system is required to co-exist with the current second (2G) and third generation (3G) wireless systems, and in particular, support handovers between the existing systems and the newly evolved EUTRAN system specified in the 3GPP TR 23.882.

Figure 1:
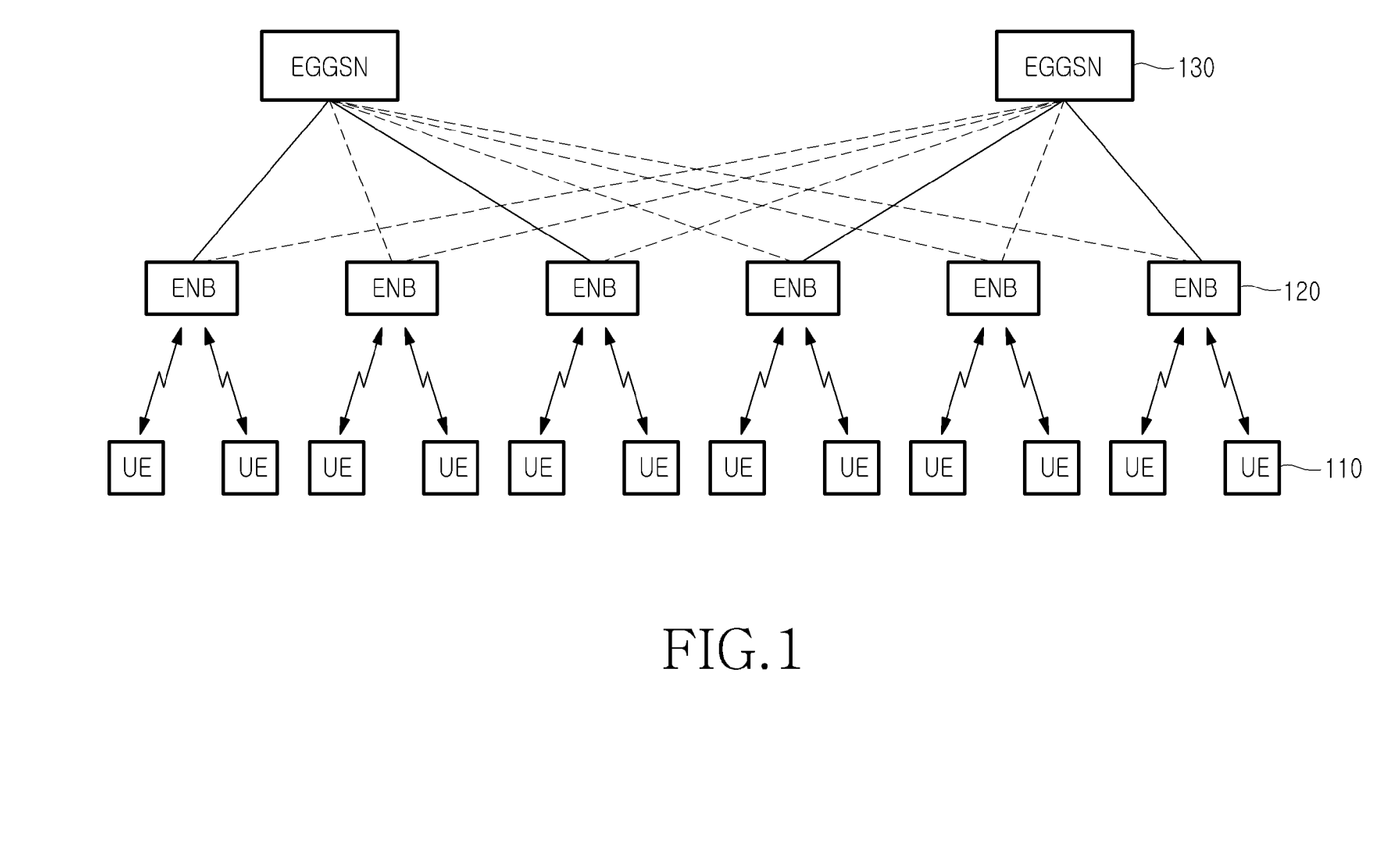
FIG. 1 illustrates the EUTRAN system architecture and network elements.

FIG. 1 illustrates the EUTRAN system architecture and network elements.

The EUTRAN system is an evolution of the 3GPP UTRAN system, which includes entities including a user equipment (UE) 110, an Enhanced Node B (ENB) 120 and an Enhanced GGSN (EGGSN) 130, as shown in the FIG. 1. The ENB 120 of the EUTRAN system has the features of the Node B and the radio network controller (RNC) of the legacy UTRAN system. The EGGSN 130 has the functionalities of the SGSN and the GGSN of the legacy UTRAN systems.

Figure 2:
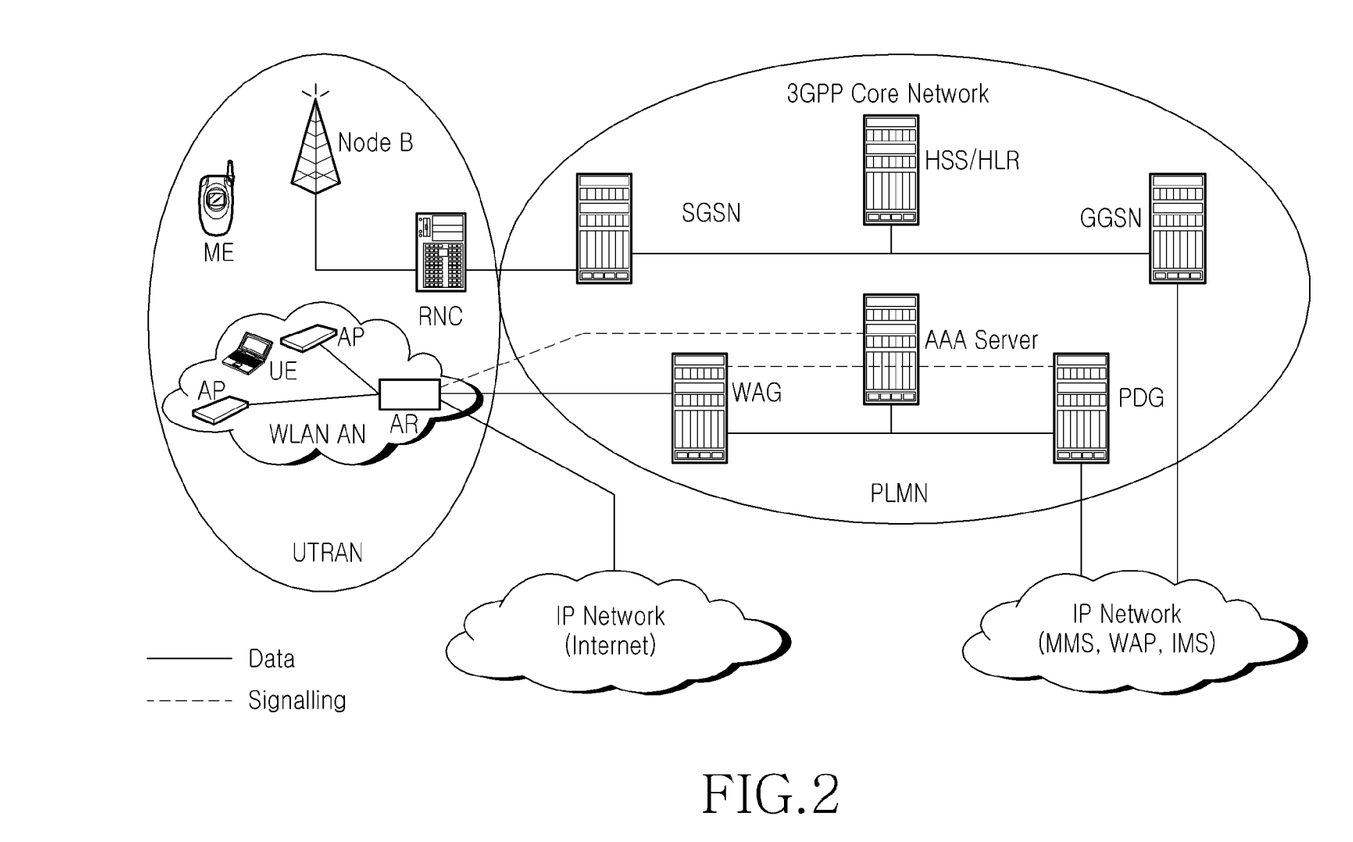
FIG. 2 illustrates the IWLAN system architecture and network elements.

FIG. 2 illustrates the IWLAN system architecture and network elements.

As shown in FIG. 2, the Integrated WLAN (I-WLAN) system specified in the 3GPP TS 23.234 specifications provides a system and method to integrate legacy UTRAN systems with WLAN systems, as shown in the FIG. 2. The I-WLAN system allows WLAN users to access 3GPP packet switched services.

DISCLOSURE OF INVENTION

Technical Problem

Currently, there is no efficient mechanism specified to provide handover between the I-WLAN and the EUTRAN access systems.

Technical Solution

Therefore, the present invention has been made in view of the above-mentioned problems, and it is an object of the present invention to provide a system and method for providing handover between the I-WLAN and the EUTRAN access systems.

Another object of the invention is to provide a method for optimizing the network access authentication procedure during handover.

According to an aspect of the present invention, the data destined to the UE are buffered by the serving AS during handover procedure, and the data are then forwarded to the UE after the handover procedure in order to minimize data loss.

According to another aspect of the present invention, the UE in the EUTRAN access network sends the Handover preparation or request message to the I-WLAN access network through the EGGSN or any other entity which has the functionality of GGSN and SGSN.

According to another aspect of the present invention, the Handover preparation or request message sent by the UE from the EUTRAN AS to I-WLAN AS contains the S-bit (indicated whether simultaneous access is supported or not), Network Access Identifier (NAI), accessing Radio Access Technology (RAT) type, Authentication Vectors, the EGGSN IP address and other parameters relevant to mobility and security mechanism. Authentication Vectors and the EGGSN IP address are included by the serving EGGSN while forwarding the Handover preparation or request message.

According to another aspect of the present invention, a signaling interface is provided between the EGGSN and the AAA server to exchange messages between them.

According to another aspect of the present invention, the IP address of the serving EGGSN, active and unused authentication vectors in the AAA server corresponding to the UE, are stored if Handover (HO) request is from the EUTRAN network.

According to another aspect of the present invention, the AAA server assigns or obtains and sends an IP address to the UE while sending the Handover accept or response message.

According to another aspect of the present invention, the IP address sent by the AAA server is relayed to the UE through the Handover command by the EGGSN.

According to another aspect of the present invention, the EGGSN resolves the W-APN and sends the list of PDGs IP addresses to the UE through the HO command, or alternatively the EGGSN can select a particular Packet Data Gateway (PDG) and send the IP address of the selected PDG to the UE through the HO command.

According to another aspect of the present invention, the UE and the AAA server derives tunnel authentication keys using the active EUTRAN network access authentication keys for I-WLAN access authentication.

According to another aspect of the present invention, the IP address of the serving EGGSN stored by the AAA server is sent to the PDG during the tunnel establishment procedure. Using the IP address, PDG contacts the serving EGGSN to retrieve the buffered packet destined to the UE.

According to another aspect of the present invention, the AAA server triggers the EGGSN to release the radio resource of the UE in the EUTRAN after establishing a tunnel towards the PDG.

According to another aspect of the present invention, the IP address of the UE is released if an MIPbased solution is not used.

According to another aspect of the present invention, the EGGSN bicasts the UE destined packets to the I-WLAN, in the case of a UE capable of simultaneous access.

According to another aspect of the present invention, it is intimated to the core network entities whether the UE is capable of simultaneous access.

According to another aspect of the present invention, the UE detaches the previous access system after establishing the connection with the other access system.

According to another aspect of the present invention, the UE initiates buffering of the data at the PDG through a new IKEv2 notification payload or through some other signaling message like an MIP buffer management mechanism.

According to another aspect of the present invention, the RAU message, or alternatively, any initial L3 message after the L2 connection, sent by the UE during handover from the I-WLAN to the EUTRAN AS contains the S-bit, NAI, accessing RAT type, PDG IP address and other parameters relevant to a mobility and security mechanism.

According to another aspect of the present invention, the EGGSN retrieves the active Keys from the AAA server to authenticate the UE to access EUTRAN.

Advantageous Effects

The present invention provides a mobility solution for a case where a UE either can or cannot simultaneously access I-WLAN and EUTRAN access systems. Further, the present invention optimizes the network access authentication process during handover, thereby supporting the UE to perform a smooth handover between the I-WLAN and EUTRAN access systems.

While this invention has been described in connection with what are presently considered to be the most practical and preferred embodiments, it is to be understood that the invention is not limited to the disclosed embodiment and the drawings, but, on the contrary, it is intended to cover various modifications and variations within the spirit and scope of the appended claims.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Hereinafter, preferred embodiments of the present invention will be described with reference to the accompanying drawings. In the following description, a detailed description of known functions and configurations incorporated herein will be omitted when it may make the subject matter of the present invention rather unclear. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The present invention is directed to the scenario where a UE handover from the I-WLAN to the EUTRAN access networks and also from the EUTRAN to the I-WLAN Access system. The method of the invention includes mechanisms that provide a mobility solution for the UE capable of simultaneous access, and also for the UE which cannot access the access systems simultaneously. This invention also includes a mechanism to utilize the active authentication key in one access system to be used in the other access system in order to optimize the authentication procedure during handover.

Accordingly, this invention explains a method and system for providing mobility between interworking WLAN and EUTRAN access systems where handover from the EUTRAN to the I-WLAN access system involves a UE sending periodic or event based measurements to the EUTRAN network wherein if the UE measurement is below the threshold or if EUMTS RAT cannot be continued, then EGGSN/ENB requests the UE to start scanning other RATs, or alternatively, by L2 or other means, and the UE decides that the EUTRAN cannot be continued and starts scanning the other RATs.

The UE directly sends the HO request to the AAA server through EGGSN, and the packet is routed to the home AAA server by resolving the NAI where the HO request message contains the S-bit, NAI, RAT type, Authentication Vectors and EGGSN IP address included by the EGGSN, and alternatively, the UE sends the measurements of I-WLAN to the EGGSN, as requested by the EGGSN, to scan other RATs. The measurement includes the details of the I-WLAN like WLAN ID, NAI and W-APN/s formed by the UE according to the current ongoing applications.

The EGGSN resolves IP addresses of the PDG using the W-APN(s), and the HO request is sent to the AAA server using NAI where the HO request sent by the EGGSN contains the NAI, RAT type, Authentication Vectors and the EGGSN IP address included by the EGGSN.

The AAA server verifies the NAI and stores the Authentication vectors and the EGGSN IP optional Address, sends the HO accept message to the EGGSN where the AAA server assigns a new IP address to the UE and includes the IP address in the HO accept message where optionally, specifies the PDG IP address in the HO accept message, for the UE to establish the tunnel.

The EGGSN sends the HO command to the UE. If the EGGSN resolves the PDG IP address/addresses, then the EGGSN includes the IP address/addresses in the HO command. Further, if the AAA server sends the IP address to the UE in the HO accept message, then the EGGSN includes the IP address in the HO command. If S-bit is off, then the EGGSN starts buffering the packets destined to the UE, and if S-bit is on, the EGGSN does not buffer the data destined to the UE.

After receiving the HO command, the UE starts the IKEv2 procedure to establish the IPsec tunnel towards the PDG, and the UE selects the IP address of the PDG from the list provided by the EGGSN or UE to resolve the IP addresses of the PDGs. The UE uses the active keys to derive the authentication keys and send the AUTH payload, in order to eliminate the EAP authentication procedure for IPsec tunnel establishment.

The UE performs the MIP registration procedure and registers with the EGGSN where the UE uses the EUTRAN IP address as the HoA, the PDG IP address as the CoA and the I-WLAN assigned IP address as the Co-CoA. The MIP registration is done for the FA-CoA where the MIP registration message is sent to the PDG by the UE and then it is forwarded by the PDG to the appropriate EGGSN.

For applications initiated by the UE in the I-WLAN, the UE uses the I-WLAN assigned IP address as the source IP address, and the UE directly contacts the correspondent node, or alternatively, for the new applications initiated by the UE in the I-WLAN, the UE uses the reverse tunneling.

The AAA server uses the active keys provided by the EGGSN to derive the tunnel authentication keys and pass the said keys to the PDG for authentication where the AAA server includes the EGGSN IP address in the Access Accept message. The AAA server stores the serving EGGSN IP address during the HO preparation procedure, or alternatively, the AAA server obtains the new information about the UE in the HSS from the HSS before updating.

The UE uses the AAA MIP registration procedure to do MIP registration during the IPsec tunnel establishment procedure where the MIP registration authenticator is generated from the active network access keys. The AAA server forwards the MIP registration message to the EGGSN, and the EGGSN registers the UE and sends the MIP ACK message to the UE via PDG.

After the successful authentication and tunnel establishment procedure, if the UE is not capable of simultaneous access, then the AAA/HSS triggers the EGGSN to release the radio resources allocated to the UE, and if the UE is capable of simultaneous access, then the UE starts a EUMTS detach procedure. The PDG establishes a tunnel towards the EGGSN like the tunnel between the HA and the FA, and if the EGGSN buffered the packets for the UE, then the EGGSN tunnels the buffered packets to the PDG and the PDG forwards the packets to the UE.

Further, if the UE is capable of simultaneous access, then the EGGSN starts bicasting the packets to both the EUTRAN and I-WLAN access systems. After starting the reception of the packets from the EGGSN, the UE performs an MIP based route optimization procedure with a Correspondent Node (CN), and if the CN supports MIP, and tunnel overhead is not considered to be a disadvantage. If no active TCP connections are present, then the UE does SIPbased terminal mobility procedure, and if it has any active IMSbased sessions and avoids the MIP based mobility procedure, the UE intimates the release of the IP to the EGGSN in the HO confirm message.

The HO complete message is sent within the IKEv2 or with any new signaling protocol, and if the MIP based solution is used, then the UE just confirms the HO by sending the HO complete message within the IKEv2 or with any new signaling protocol, and the PDG relays the HO complete message to the EGGSN.

Accordingly, the invention also explains a method and a system for providing mobility between interworking WLAN and EUTRAN access systems where handover from the I-WLAN to the EUTRAN access system involves the UE starting scanning of the other RAT, and deciding to attach with the EUMTS AS based on the signal strength of I-WLAN or by other means.

Specifically, if the UE is not capable of simultaneous access, then the UE intimates the PDG to buffer the packets destined to the UE through a new IKEv2 notification payload, or through a signaling message like MIP buffer management mechanism where optionally, the UE requests the PDG to close the IPsec tunnel and resources reserved for the UE, and the PDG starts buffering the packets destined to the UE. The UE establishes an L2/RRC connection with the EUMTS network, and the UE sends the RAU message, or alternatively, any initial L3 message after the L2 connection, including the HO preparation message containing S-bit, I-WLAN ID, NAI and the PDG IP address, where the user part of the NAI contains the IMSI or pseudonym or reauthentication ID. The EGGSN, with the NAI, resolves the AAA server serving the UE and retrieves the active AKA keys and also unused AVs from the AAA server, where EGGSN updates the HSS about the new location of the UE.

Optionally, the HSS/AAA requests the PDG to release the tunnel established for the UE, if the UE is not capable of simultaneous access. EGGSN starts the integrity/ciphering using the active AKA keys and provides the temporary identifiers, IP address and KSI to the UE in the RAU accept message, or alternatively, in the response message to the initial L3 request. The EGGSN establishes a tunnel with the PDG, and if the S bit is off, then the EGGSN requests the PDG to forward all the packets destined to the UE. The PDG tunnels the buffered packets to the EGGSN, and the EGGSN forwards the packets to the UE. If the S-bit is on, then the PDG starts bicasting the packets destined to the UE.

After starting the reception of the packets through the EGGSN, if the UE is capable of simultaneous access, then the UE closes the I-WLAN tunnel, and the UE performs the MIP based route optimization procedure with the CN, if the CN supports MIP, and tunnel overhead is not considered to be a disadvantage. If no active TCP connections are present, then the UE performs the SIP-based terminal mobility procedure, and if the UE has any active IMS based sessions and avoid the MIP based mobility procedure, then the UE intimates the release of IP to the EGGSN in the HO confirm message, where if MIP based solution is used, then the UE just confirms the HO by sending the HO complete message, and the EGGSN relays the HO complete message to the PDG.

Hereinafter, specific embodiments of a method for handover between an I-WLAN access system and a EUTRAN according to the present invention will be described in detail.

$1^{ST}$ Embodiment

Figure 3:
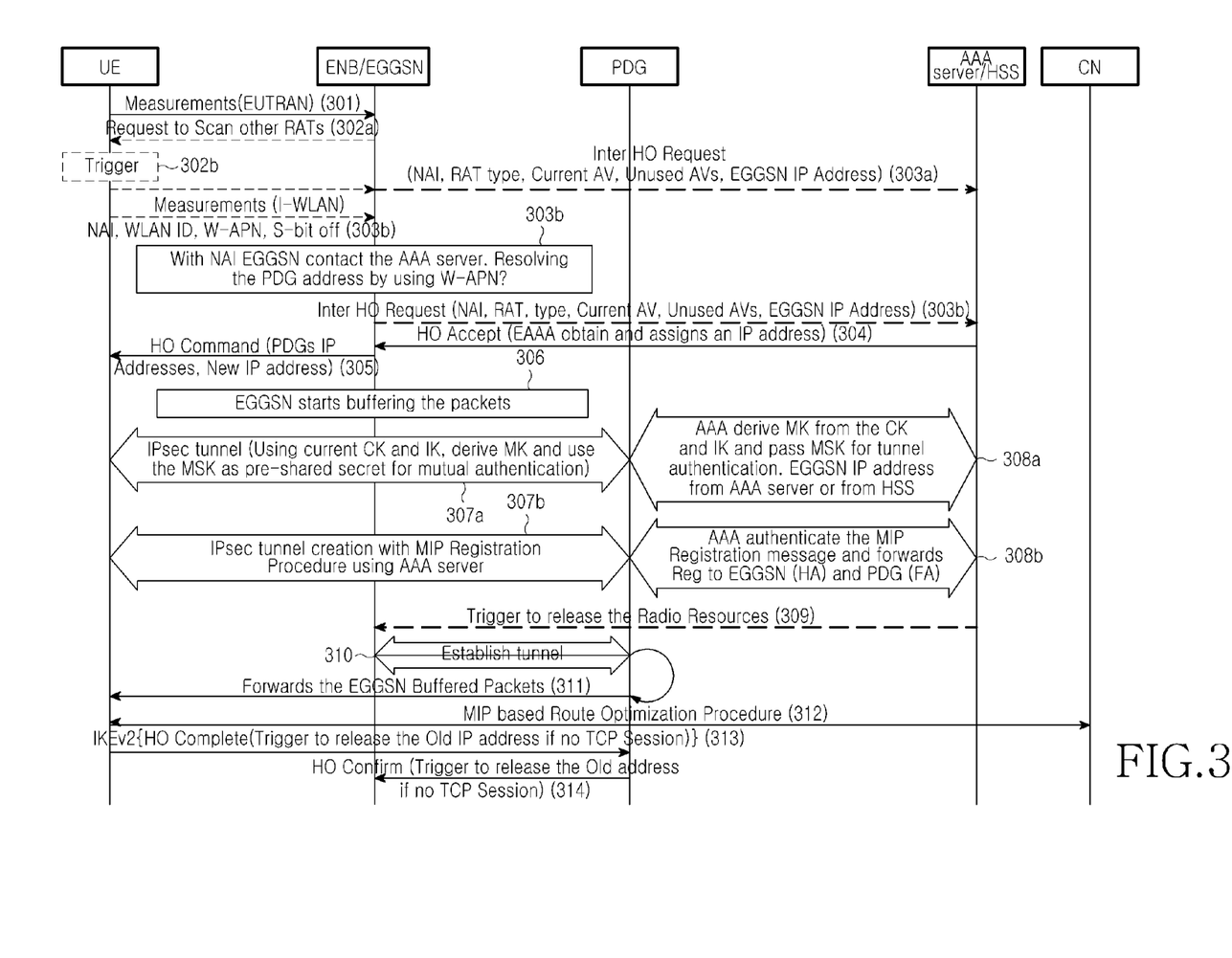
FIG. 3 illustrates the sequence of the message flow during handover from the EUTRAN AS to the I-WLAN AS when the UE is not capable of simultaneous access.

FIG. 3 illustrates the sequence of the message flow during handover from the EUTRAN AS to the I-WLAN AS, when the UE is not capable of simultaneous access.

Referring to FIG. 3, the UE sends periodic or event based measurements to the EUTRAN network (step 301). If the EGGSN finds that the UE measurement is below the threshold or the EGGSN decides by any other mean that EUMTS RAT cannot be continued, then the EGGSN/ENB can request the UE to start scanning other RATs (step 302a), or alternatively, by L2 or by some other means, the UE decides that the EUTRAN cannot be continued and starts scanning the other RATs (step 302b).

The UE directly sends the HO request to the AAA server, through the EGGSN (step 303a). The packet can be routed to the home AAA server by resolving the NAI. The HO request message contains the S-bit, NAI, RAT type, Authentication Vectors and the EGGSN IP address (included by the EGGSN), or alternatively, the UE may send the measurements of I-WLAN to the EGGSN as requested by the EGGSN to scan other RATs (step 303b). This measurement includes the details of the I-WLAN such as WLAN ID, NAI and W-APN/s (formed by the UE according to the current ongoing application/s). Optionally, the EGGSN resolves IP addresses of the PDG using the W-APN(s). The HO request is sent to AAA server using NAI (step 303b). The HO request sent by the EGGSN contains the NAI, RAT type, Authentication Vectors and EGGSN IP address (included by the EGGSN).

The AAA server verifies the NAI and stores the Authentication vectors and the EGGSN IP Address (Optional). The AAA server then sends the HO accept message to the EGGSN. The AAA server may assign a new IP address (the AAA server may assign multiple new IP addresses, if more than one session is active) to the UE and may include the IP address in the HO accept message. Optionally, the AAA server may specify the PDG IP address in the HO accept message, for the UE to establish the tunnel.

The EGGSN then sends the HO command to the UE (step 305). If the EGGSN resolves the PDG IP address/addresses, then the EGGSN includes the IP address/addresses in the HO command. If the AAA server sends the IP address to the UE in the HO accept message, then the EGGSN includes the IP address in the HO command.

Then, the EGGSN starts buffering the packets destined to the UE (step 306).

After receiving the HO command, the UE starts the IKEv2 procedure to establish the IPsec tunnel towards the PDG (step 307a). The UE may select the IP address of the PDG from the list provided by the EGGSN or the UE by itself can resolve the IP addresses of the PDGs. The UE uses the active CK and IK to derive the MSK and directly calculates and sends the IKE AUTH payload, so that the UE eliminates the EAP authentication procedure for IPsec tunnel establishment.

Thereafter, the AAA server also uses the same active CK and IK provided by the EGGSN to derive the MSK and pass it to the PDG for authentication (step 308a). The AAA server includes the EGGSN IP address in the Access Accept message. As the AAA server stores the serving EGGSN IP address during the HO preparation procedure, or alternatively, the AAA server obtains from the HSS, before updating, the new information about the UE in the HSS. The AAA server forwards the MIP registration message to the EGGSN. The EGGSN registers the UE and sends the MIP ACK message to the UE via PDG.

Meanwhile, after receiving the HO command from the EGGSN, the UE may perform the MIP as a registration procedure, and may register with the EGGSN (step 307b). In this scenario, the EGGSN has the functionality like HA, and the PDG has the functionality like FA, for MIPv4-like procedures. The UE uses the EUTRAN IP address as the HoA, the PDG IP address as the CoA, and also the I-WLAN assigned IP address as the Co-CoA. The MIP registration is done for FA-CoA to avoid tunnel overhead. The MIP registration message is sent to the PDG by the UE, and is then forwarded by the PDG to the appropriate EGGSN.

For applications initiated by the UE in the I-WLAN, the UE may use the I-WLAN assigned IP address as the source IP address, so the UE directly contacts the correspondent node (CN), or alternatively, for the new applications initiated by the UE in the I-WLAN, the UE may use the reverse tunneling, that is, the packets will be tunneled by the PDG (FA) to the EGGSN (HA), then the EGGSN forwards the packets to the correspondent node.

After a successful authentication and tunnel establishment procedure, the AAA/HSS triggers the EGGSN to release the radio resources allocated to the UE (step 309).

The PDG establishes a tunnel towards the EGGSN as tunnel between HA and FA (step 310).

The EGGSN tunnels the buffered packets to the PDG and the PDG forwards the packets to the UE (step 311).

After starting the receiving of the packets from the EGGSN, if the CN supports MIP, and tunnel overhead is not considered to be a disadvantage, the UE may perform an MIP based route optimization procedure with the CN (step 312). Further, if no active TCP connections were present, then the UE can perform the SIP-based terminal mobility procedure. If it has any active IMS based sessions, the UE can avoid the MIP-based mobility procedure.

The UE can intimate the release of the IP to the EGGSN in the HO confirm message (step 313). The HO complete message is sent within the IKEv2 or with any new signaling protocol. If an MIP-based solution is used, then the UE just confirms the HO by sending the HO complete message within the IKEv2 or with any new signaling protocol.

The PDG confirms the handover by relaying the HO complete message to the EGGSN (step 314).

$2^{ND}$ Embodiment

Figure 4:
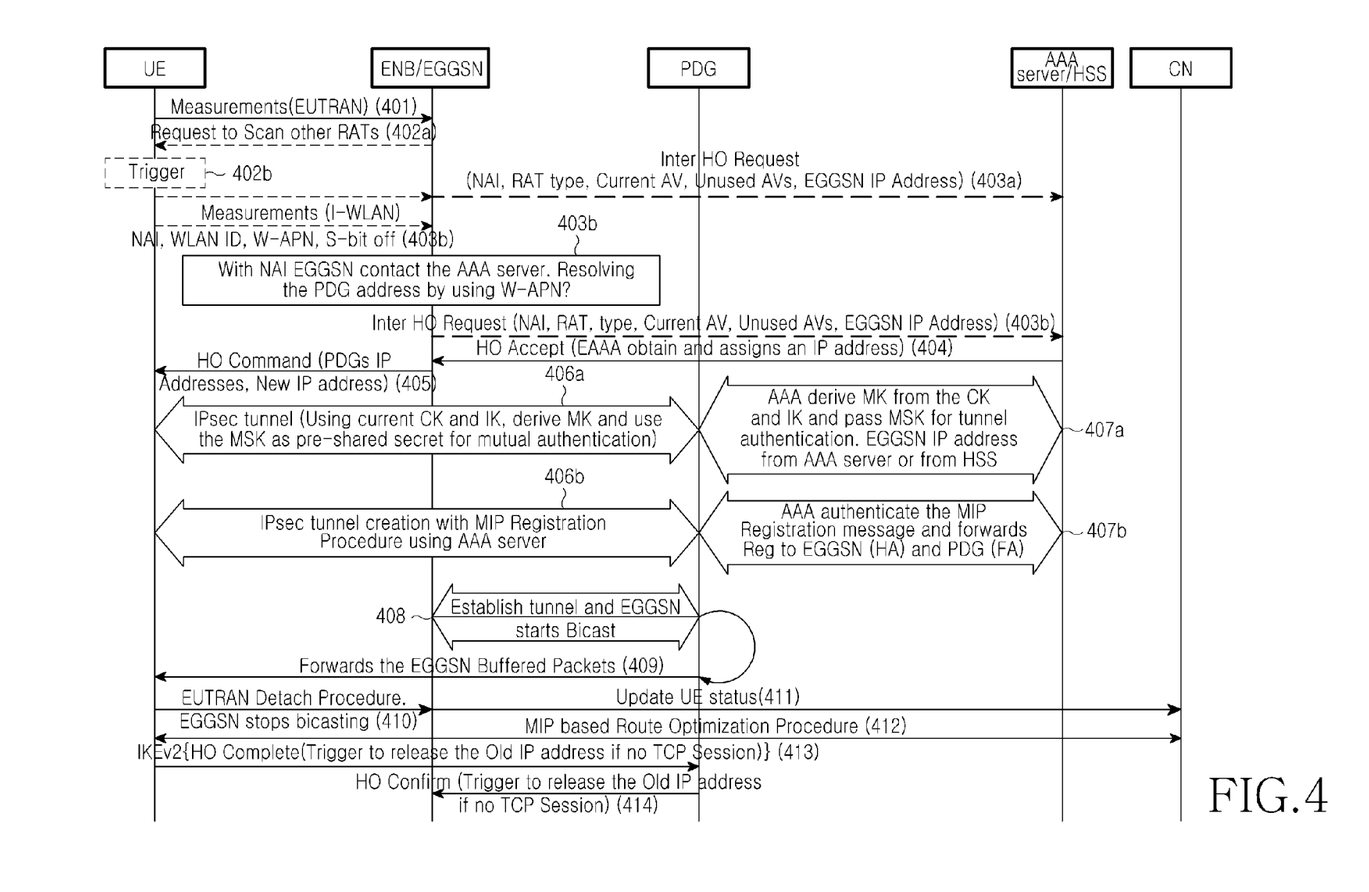
FIG. 4 illustrates the sequence of the message flow during handover from the EUTRAN AS to the I-WLAN AS when the UE is capable of simultaneous access.

FIG. 4 illustrates the sequence of the message flow during handover from the EUTRAN AS to the I-WLAN AS when the UE is capable of simultaneous access.

Referring to FIG. 4, the UE sends periodic or event based measurements to the EUTRAN (step 401).

If the EGGSN/ENB finds that UE measurement is below the threshold, or the EGGSN decides by any other mean that EUMTS RAT cannot be continued, then EGGSN/ENB can request the UE to start scanning other RATs (step 402a). Otherwise, by L2 or by some other means, the UE understands that the EUMTS RAT cannot be continued and starts scanning the other RATs (step 402b).

The UE can directly send the HO request to the AAA server through the EGGSN (step 403a). The packets can be routed to the home AAA server by resolving the NAI. The HO request message contains the NAI, RAT type, Authentication Vectors and EGGSN IP address (included by the EGGSN). The UE may send the measurements of I-WLAN to the EGGSN as requested by the EGGSN to scan other RATs (step 403b). This measurement includes the details of the I-WLAN like WLAN ID, NAI and W-APN/s (formed by the UE according to the current ongoing application/s). The EGGSN resolves IP addresses of the PDG using the W-APN(s) (Optional) (step 403b). Then, the HO request is sent to the AAA server using NAI (step 403b). The HO request sent by the EGGSN contains the NAI, RAT type, Authentication Vectors and EGGSN IP address (included by the EGGSN).

The AAA server verifies the NAI and stores the Authentication vectors and the EGGSN IP Address (Optional). The AAA server then sends the HO accept message to the EGGSN (step 404). The AAA server may assign a new IP address to the UE (the AAA server may assign multiple new IP addresses, if more than one session is active) and may include the IP address in the HO accept message. Optionally, the AAA server may specify the PDG IP address in the HO accept message, for the UE to establish the tunnel.

The EGGSN then sends the HO command to the UE (step 405). If the EGGSN resolves the PDG IP address/addresses, then the EGGSN includes the IP address/addresses in the HO command. If the AAA server sends the IP address to the UE in the HO accept message, then the EGGSN includes the IP address in the HO command.

After receiving the HO command, the UE starts the IKEv2 procedure to establish the IPsec tunnel towards the PDG (step 406a). The UE may select the IP address of the PDG from the list provided by the EGGSN or the UE by itself can resolve the IP addresses of the PDGs. The UE uses the active CK and IK to derive the MSK and directly calculates and sends the IKE AUTH payload, so that the UE eliminates the EAP authentication procedure for IPsec tunnel establishment.

Thereafter, the AAA server also uses the same active CK and IK provided by the EGGSN to derive the MSK and pass it to the PDG for authentication (step 407a). The AAA server includes the EGGSN IP address in the Access Accept message. The AAA server stores the serving EGGSN IP address during the HO preparation procedure, or alternatively, the AAA server obtains from the HSS, before updating, the new information about the UE in the HSS. The AAA server forwards the MIP registration message to the EGGSN (step 407a). The EGGSN registers the UE and sends the MIP Ack message to the UE via PDG.

Meanwhile, after receiving the HO command from the EGGSN, the UE may perform the MIP as a registration procedure and may register with the EGGSN (step 406b). In this scenario, the EGGSN has the functionality like HA and the PDG has the functionality like FA, for MIPv4-like procedures. The UE uses the EUTRAN IP address as the HoA, the PDG IP address as the CoA, and also the I-WLAN assigned IP address as the Co-CoA.

The MIP registration is done for FA-CoA to avoid tunnel overhead. The MIP registration message is sent to the PDG by the UE, and is then forwarded by the PDG to the appropriate EGGSN.

For applications initiated by the UE in the I-WLAN, the UE may use the I-WLAN assigned IP address as the source IP address, so the UE directly contacts the correspondent node (CN), or alternatively, for the new applications initiated by the UE in the I-WLAN, the UE may use the reverse tunneling, that is, the packets will be tunneled by the PDG (FA) to the EGGSN (HA), then the EGGSN forwards the packets to the correspondent node.

The AAA server forwards the MIP registration message to EGGSN (step 407b). The EGGSN registers the UE and sends the MIP ACK message to the UE via PDG.

The PDG establishes a tunnel towards the EGGSN like the tunnel between HA and FA. The EGGSN starts bicasting the packets to both EUMTS AS and I-WLAN AS (step 408).

Then, the UE starts to receive the packets through the I-WLAN (step 409), initiates the EUMTS detach procedure, and requests the EGGSN to stop the bicasting (step 410).

Then, the EGGSN updates the closed status of the UE in the HSS (step 411).

If the CN supports the MIP, and the tunnel overhead is not considered to be a disadvantage, the UE may perform the MIP based route optimization procedure with the CN (step 412).

Further, if no active TCP connections were present, then the UE can perform the SIP-based terminal mobility procedure. If it has any active IMS based sessions, the UE can avoid the MIP-based mobility procedure.

The UE can intimate the release of IP to the EGGSN in the HO complete message (step 413). The HO complete message is sent within the IKEv2 or with any new signaling protocol. If an MIP based solution is used, then the UE just confirms the HO by sending the HO complete message within the IKEv2 or with any new signaling protocol.

The PDG confirms the handover by relaying the HO complete message to the EGGSN (step 414).

3$^{RD}$ Embodiment

Figure 5:
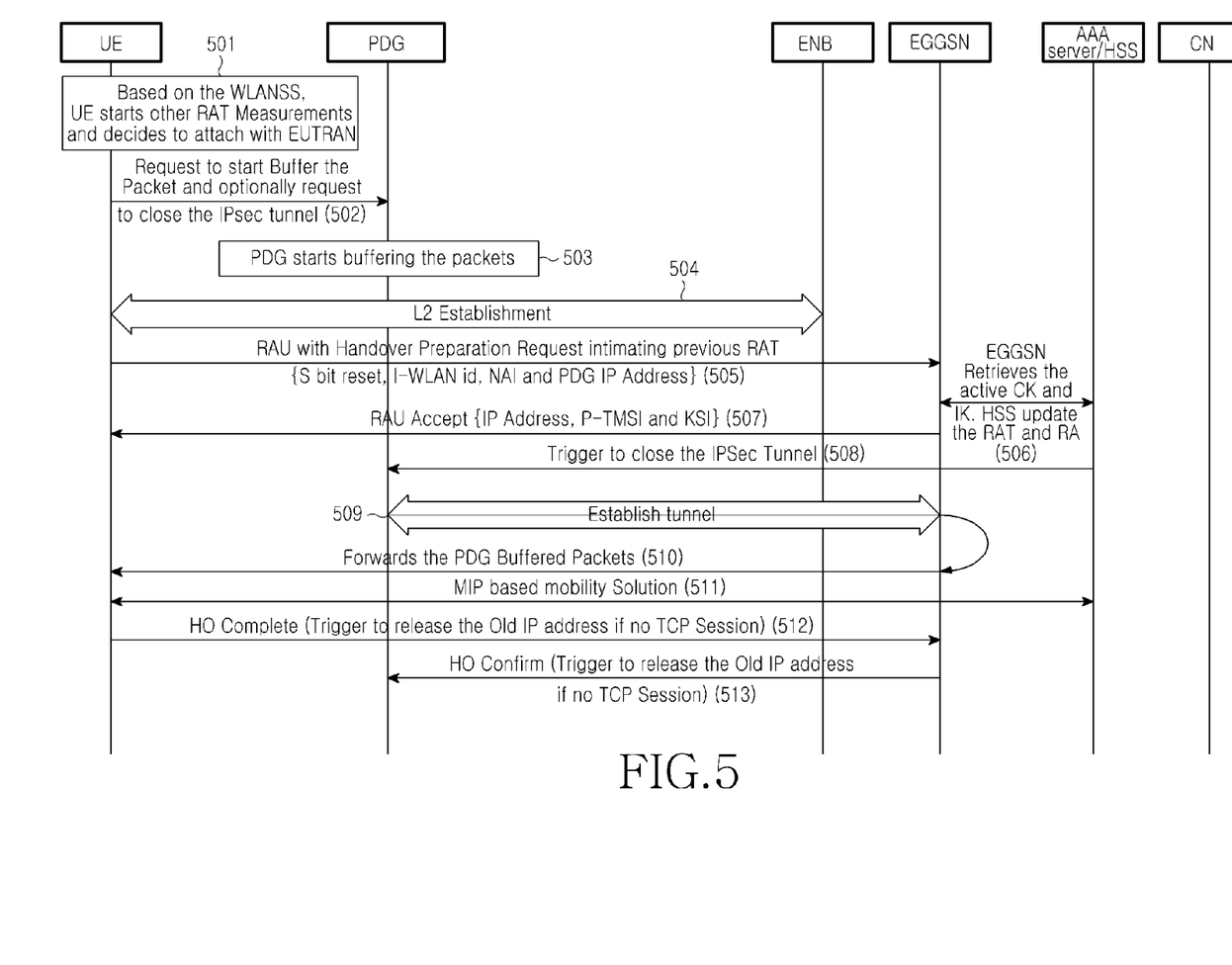
FIG. 5 illustrates the sequence of the message flow during handover from the I-WLAN AS to the EUTRAN AS when the UE is not capable of simultaneous access.

FIG. 5 illustrates the sequence of the message flow during handover from the I-WLAN AS to the EUTRAN AS when the UE is not capable of simultaneous access to the I-WLAN AS and the EUTRAN AS.

Referring to FIG. 5, based on the signal strength of I-WLAN or by other means, the UE starts scanning the other RATs and decides to attach with the EUMTS AS (step 501).

The UE intimates the PDG to buffer the packets destined to it through a new IKEv2 notification payload or through some other signaling message like MIP buffer management mechanism (step 502). Optionally, the UE may request the PDG to close the IPsec tunnel and resources reserved for this UE.

The PDG starts buffering the packets destined to the UE (step 503).

Then, the UE starts L2 connection establishment with the EUMTS network (step 504).

After the L2 connection, the UE sends the RAU message, or alternatively, any initial L3 message, including the HO preparation message containing I-WLAN ID, NAI and the PDG IP address, to the EGGSN (step 505). The user part of the NAI contains the IMSI, pseudonym, or re-authentication ID.

The EGGSN, having received the NAI, resolves the AAA server serving the UE and retrieves the CK and IK, as well as unused AVs from the AAA server. The EGGSN updates the HSS about the new location of the UE (step 506).

The EGGSN starts the integrity/ciphering using the CK and IK and provides the temporary identifiers, IP address and KSI to the UE in the RAU accept message or alternatively in the response message to the initial L3 request (step 507).

Optionally, the HSS/AAA requests the PDG to release the tunnel established for the UE (step 508).

The EGGSN establishes a tunnel with the PDG, and if the S (simultaneous) bit is off, then the EGGSN requests the PDG to forward all the packets destined to the UE (step 509).

The PDG tunnels the buffered packets to the EGGSN, and then the EGGSN forwards them to the UE (step 510).

After starting the reception of the packets through the EGGSN, if the CN supports MIP, and the tunnel overhead is not considered to be a disadvantage, the UE may perform the MIP-based route optimization procedure with the CN (step 511).

If no active TCP connections are present, then the UE can perform the SIP-based terminal mobility procedure. If it has any active IMS based sessions, the UE can avoid the MIP-based mobility procedure.

If the MIP-based solution is used, then the UE just confirms the HO by sending the HO complete message (step 512).

The EGGSN confirms the handover by relaying the HO complete message to the PDG (step 513).

4$^{TH}$ Embodiment

Figure 6:
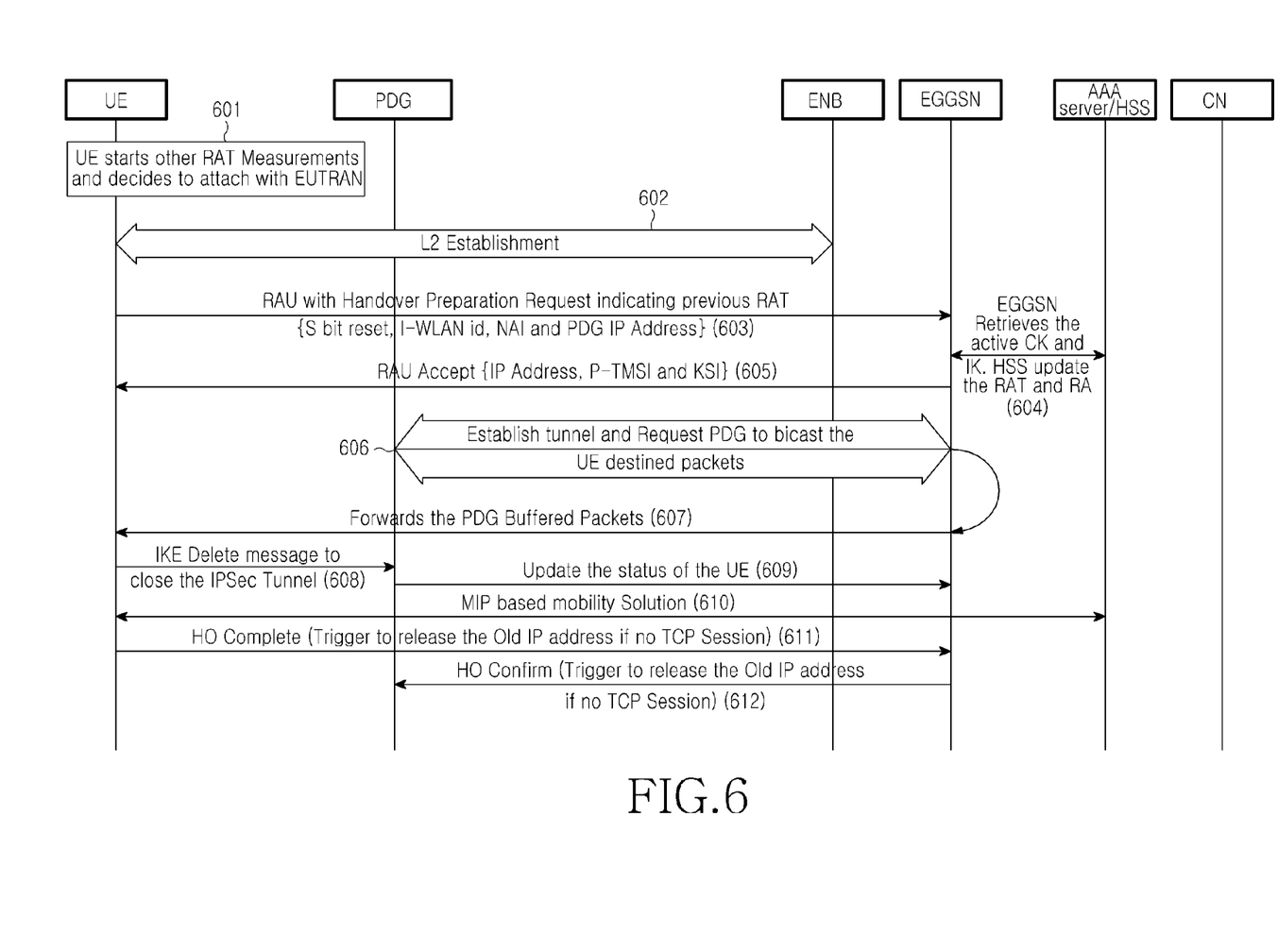
FIG. 6 illustrates the sequence of the message flow during handover from the I-WLAN AS to the EUTRAN AS when the UE is capable of simultaneous access.

FIG. 6 illustrates the sequence of the message flow during handover from the I-WLAN AS to the EUTRAN AS when the UE is capable of simultaneous access to the I-WLAN AS and the EUTRAN AS.

Referring to FIG. 6, based on the signal strength of I-WLAN or by other means, the UE starts scanning the other RATs and decides to attach with the EUMTS AS (step 601).

Then, the UE starts L2 connection establishment with the EUMTS network (step 602).

After the L2 connection, the UE sends the RAU message, or alternatively, any initial L3 message, including the HO preparation message containing I-WLAN ID, NAI and the PDG IP address, to the EGGSN (step 603). The user part of the NAI contains the IMSI, or pseudonym, or re-authentication ID.

The EGGSN, having received the NAI, resolves the AAA server serving the UE and retrieves the CK and IK, as well as unused AVs from the AAA server. The EGGSN updates the HSS about the new location of the UE (step 604).

The EGGSN starts the integrity/ciphering using the CK and IK and provides the temporary identifiers, IP address and KSI to the UE in the RAU accept message or alternatively in the response message to the initial L3 request (step 605).

The EGGSN establishes a tunnel with the PDG, and if the S (simultaneous) bit is on, then the EGGSN requests the PDG to bicast the packets destined to the UE (step 606).

The PDG tunnels the buffered packets to the EGGSN and then the EGGSN forwards them to the UE (step 607).

After starting the reception of the packets through the EGGSN, the UE sends the IKE delete message to close IPsec tunnel and stops bicasting the packets (step 608).

The PDG updates the status of the UE to the HSS about the I-WLAN connection close (step 609).

If the CN supports MIP, and the tunnel overhead is not considered to be a disadvantage, the UE may do the MIP based route optimization procedure with the CN (step 610).

If no active TCP connections are present, then the UE can do SIP-based terminal mobility procedure. If it has any active IMS based sessions, the UE can avoid the MIP based mobility procedure.

If the MIP-based solution is used, then the UE just confirms the HO by sending the HO complete message (step 611).

The EGGSN confirms the handover by relaying the HO complete message to the PDG (step 612).

The invention claimed is:

1. A method for supporting handover of a User Equipment (UE) from a mobile communication network to a wireless Local Area Network (LAN) in an interworking network including the mobile communication network and the wireless LAN, the method comprising the steps of:

transmitting, by the UE, a handover request message to an authentication server through the mobile communication network when the UE connected to the mobile communication network is determined to perform handover to the wireless LAN;

receiving, by the UE, a handover command message including an Internet Protocol (IP) address newly assigned to the UE by the authentication server and an IP address of a gateway of the wireless LAN;

performing, by the UE, authentication with the authentication server through the wireless LAN using the IP address of the gateway and establishing an IP security tunnel with the wireless LAN by using an active key of the mobile communication network or by performing Mobile Internet Protocol (MIP) registration;

receiving, by the UE, packets buffered in the mobile communication network from the wireless LAN through a tunnel established between the mobile communication network and the wireless LAN;

transmitting, by the UE, a handover complete message to the mobile communication network through the wireless LAN; and receiving, by the UE, packets from the wireless LAN.

2. The method as claimed in claim 1, wherein the handover request message comprises a Network Access Identifier (NAI), Radio Access Technology (RAT) type information, authentication vectors, and the IP address information of an entity of the mobile communication network, and the IP address newly assigned to the UE is created based on information included in the handover request message.

3. The method as claimed in claim 1, wherein the step of transmitting the handover request message comprises the steps of:

transmitting, by the UE, measurements for the wireless LAN, wherein the measurements for the wireless LAN include a Network Access Identifier (NAI) information and an information bit indicating if the UE can simultaneously access both the mobile communication network and the wireless LAN.

4. The method as claimed in claim 1, further comprising the step of performing, by the UE, an MIP-based route optimization procedure with a Correspondent Node (CN), after receiving the packets buffered in the mobile communication network from the wireless LAN through the tunnel.

5. A method for supporting handover of a User Equipment (UE) from a wireless Local Area Network (LAN) to a mobile communication network in an interworking network including the mobile communication network and the wireless LAN, the method comprising the steps of:

connecting, by the UE, to the mobile communication network, after the UE connected to the wireless LAN is determined to perform handover to the mobile communication network;

transmitting, by the UE, a handover request message including an IP address of a gateway of the wireless LAN to the mobile communication network for authentication with an authentication server;

receiving, by the UE, a response message including temporary identifiers, an IP address of an entity of the mobile communication terminal, and a Key Set Identifier (KSI) from the mobile communication terminal;

receiving, by the UE, packets buffered in the wireless LAN from the mobile communication network through a tunnel established between the wireless LAN and the mobile communication network;

transmitting, by the UE, a handover complete message to the wireless LAN through the mobile communication network; and receiving, by the UE, packets from the mobile communication network.

6. The method as claimed in claim 5, wherein the handover request message further comprises a Network Access Identifier (NAI) information and an information bit indicating if the UE can simultaneously access both the mobile communication network and the wireless LAN.

7. The method as claimed in claim 5, further comprising the step of performing, by the UE, a Mobile Internet Protocol (MIP)-based route optimization procedure with a Correspondent Node (CN), after receiving the packets buffered in the wireless LAN from the mobile communication network through the tunnel.

8. The method as claimed in claim 5, further comprising the step of requesting, by the UE, to the wireless LAN for buffering packets destined to the UE through a new Internet Key Exchange, version 2 (IKEv2), notification payload or Mobile Internet Protocol (MIP) buffer management mechanism.

9. A method for supporting handover of a User Equipment (UE) from a mobile communication network to a wireless Local Area Network (LAN) in an interworking network including the mobile communication network and the wireless LAN, the method comprising the steps of:

receiving, by an entity of the mobile communication network, a handover request message from the UE and transmitting the handover request to an authentication server when the UE connected to the mobile communication network is determined to perform handover to the wireless LAN;

receiving, by the entity of the mobile communication network, a handover accept message from the authentication server and transmitting a handover command message to the UE, the handover command message including an Internet Protocol (IP) address newly assigned to the UE by the authentication server and an IP address of the wireless LAN;

establishing, by the entity of the mobile communication network, a tunnel with the wireless LAN after an IP security tunnel between the UE and the wireless LAN is established based on an active key of the mobile communication network or Mobile Internet Protocol (MIP) registration and authentication between the wireless LAN and the authentication server is performed based on the IP address of the wireless LAN;

forwarding, by the entity of the mobile communication network, buffered packets to the UE through the tunnel; and receiving, by the entity of the mobile communication network, a handover complete message from the UE the wireless LAN.

10. The method as claimed in claim 9, wherein the handover request message comprises a Network Access Identifier (NAI), Radio Access Technology (RAT) type information, authentication vectors, and the IP address information of the entity of the mobile communication network, and the IP address newly assigned to the UE is created based on information included in the handover request message.

11. The method as claimed in claim 9, wherein the step of receiving the handover request message comprises the steps of:

receiving, by the entity of the mobile communication network, measurements for the wireless LAN from the UE, wherein the measurements for the wireless LAN include a Network Access Identifier (NAI) information and an information bit indicating if the UE can simultaneously access both the mobile communication network and the wireless LAN.

12. The method as claimed in claim 9, further comprising the step of buffering, by the entity of the mobile communication network, packets destined to the UE after transmitting the command message.

13. A method for supporting handover of a User Equipment (UE) from a wireless Local Area Network (LAN) to a mobile communication network in an interworking network including the mobile communication network and the wireless LAN, the method comprising the steps of:

performing, by an entity of the mobile communication network, layer 2 establishment with the UE, after the UE connected to the wireless LAN is determined to perform handover to the mobile communication network;

receiving, by the entity of the mobile communication network, a handover request message including an IP address of a gateway of the wireless LAN from the UE and performing authentication with an authentication server by using an active key;

transmitting, by the entity of the mobile communication network, a response message including temporary identifiers, an IP address of the entity of the mobile communication network, and a Key Set Identifier (KSI) to the UE;

establishing, by the entity of the mobile communication network, a tunnel with the wireless LAN;

forwarding, by the entity of the mobile communication network, packets buffered in the wireless LAN to the UE through the tunnel;

receiving, by the entity of the mobile communication network, a handover complete message from the UE and transmitting a handover confirm message to the wireless LAN.

14. The method as claimed in claim 13, wherein the handover request message further comprises a Network Access Identifier (NAI) information and an information bit indicating if the UE can simultaneously access both the mobile communication network and the wireless LAN.

15. A User Equipment (UE) apparatus for supporting handover from a mobile communication network to a wireless Local Area Network (LAN) in an interworking network including the mobile communication network and the wireless LAN, the apparatus comprising:

a controller configured to control operations of:

transmitting a handover request message to an authentication server through the mobile communication network when the UE connected to the mobile communication network is determined to perform handover to the wireless LAN, receiving a handover command message including an Internet Protocol (IP) address newly assigned to the UE by the authentication server and an IP address of a gateway of the wireless LAN, performing authentication with the authentication server through the wireless LAN using the IP address of the gateway and establishing an IP security tunnel with the wireless LAN by using an active key of the mobile communication network or by performing Mobile Internet Protocol (MIP) registration, receiving packets buffered in the mobile communication network from the wireless LAN through a tunnel established between the mobile communication network and the wireless LAN, transmitting a handover complete message to the mobile communication network through the wireless LAN, and receiving packets from the wireless LAN, and a transceiver configured to transmit the handover request message and the handover complete message and to receive the handover command message and the packets.

16. The apparatus as claimed in claim 15, wherein the handover request message comprises a Network Access Identifier (NAI), Radio Access Technology (RAT) type information, authentication vectors, and the IP address information of an entity of the mobile communication network, and the IP address newly assigned to the UE is created based on information included in the handover request message.

17. The apparatus as claimed in claim 15, wherein the transceiver is configured to transmit measurements for the wireless LAN, wherein the measurements for the wireless LAN include a Network Access Identifier (NAI) information and an information bit indicating if the UE can simultaneously access both the mobile communication network and the wireless LAN.

18. The apparatus as claimed in claim 15, wherein the controller is configured to control operation of performing an MIP-based route optimization procedure with a Correspondent Node (CN), after receiving the packets buffered in the mobile communication network from the wireless LAN through the tunnel.

19. A User Equipment (UE) apparatus for supporting handover from a wireless Local Area Network (LAN) to a mobile communication network in an interworking network including the mobile communication network and the wireless LAN, the apparatus comprising:

a controller configured to control operations of:

connecting to the mobile communication network, after the UE connected to the wireless LAN is determined to perform handover to the mobile communication network, transmitting a handover request message including an IP address of a gateway of the wireless LAN to the mobile communication network for authentication with an authentication server, receiving a response message including temporary identifiers, an IP address of an entity of the mobile communication terminal, and a Key Set Identifier (KSI) from the mobile communication terminal, receiving packets buffered in the wireless LAN from the mobile communication network through a tunnel established between the wireless LAN and the mobile communication network, transmitting a handover complete message to the wireless LAN through the mobile communication network, and receiving packets from the mobile communication network; and a transceiver configured to transmit the handover request message and the handover complete message and to receive the response message and the packets.

20. The apparatus as claimed in claim 19, wherein the handover request message further comprises a Network Access Identifier (NAI) information and an information bit indicating if the UE can simultaneously access both the mobile communication network and the wireless LAN.

21. The apparatus as claimed in claim 19, wherein the controller is configured to control operation of performing a Mobile Internet Protocol (MIP)-based route optimization procedure with a Correspondent Node (CN), after receiving the packets buffered in the wireless LAN from the mobile communication network through the tunnel.

22. The method as claimed in claim 19, wherein the controller is configured to control operation of requesting to the wireless LAN for buffering packets destined to the UE through a new Internet Key Exchange, version 2 (IKEv2), notification payload or Mobile Internet Protocol (MIP) buffer management mechanism.

23. An apparatus for supporting handover of a User Equipment (UE) from a mobile communication network to a wireless Local Area Network (LAN) in an interworking network including the mobile communication network and the wireless LAN, the apparatus comprising:

a controller configured to control operations of:

receiving a handover request message from the UE and transmitting the handover request to an authentication server when the UE connected to the mobile communication network is determined to perform handover to the wireless LAN, receiving a handover accept message from the authentication server and transmitting a handover command message to the UE, the handover command message including an Internet Protocol (IP) address newly assigned to the UE by the authentication server and an IP address of the wireless LAN, establishing a tunnel with the wireless LAN after an IP security tunnel between the UE and the wireless LAN is established based on an active key of the mobile communication network or Mobile Internet Protocol (MIP) registration and authentication between the wireless LAN and the authentication server is performed based on the IP address of the wireless LAN, forwarding buffered packets to the UE through the tunnel, and receiving a handover complete message from the UE the wireless LAN; and a transceiver configured to receive the handover request message, the handover accept message and the handover complete message, and to forward the buffered packets.

24. The apparatus as claimed in claim 23, wherein the handover request message comprises a Network Access Identifier (NAI), Radio Access Technology (RAT) type information, authentication vectors, and the IP address information of the entity of the mobile communication network, and the IP address newly assigned to the UE is created based on information included in the handover request message.

25. The apparatus as claimed in claim 23, wherein the transceiver is configured to receive measurements for the wireless LAN from the UE, wherein the measurements for the wireless LAN include a Network Access Identifier (NAI) information and an information bit indicating if the UE can simultaneously access both the mobile communication network and the wireless LAN.

26. The method as claimed in claim 23, wherein the controller is configured to control operation of buffering packets destined to the UE after transmitting the command message.

27. An apparatus for supporting handover of a User Equipment (UE) from a wireless Local Area Network (LAN) to a mobile communication network in an interworking network including the mobile communication network and the wireless LAN, the apparatus comprising:

a controller configured to control operations of:

performing layer 2 establishment with the UE, after the UE connected to the wireless LAN is determined to perform handover to the mobile communication network, receiving a handover request message including an IP address of a gateway of the wireless LAN from the UE and performing authentication with an authentication server by using an active key, transmitting a response message including temporary identifiers, an IP address of an entity of the mobile communication network, and a Key Set Identifier (KSI) to the UE, establishing a tunnel with the wireless LAN, forwarding packets buffered in the wireless LAN to the UE through the tunnel, and receiving a handover complete message from the UE and transmitting a handover confirm message to the wireless LAN; and a transceiver configured to a transceiver configured to receive the handover request message, the handover complete message, to transmit the response message, and to forward the buffered packets.

28. The apparatus as claimed in claim 27, wherein the handover request message further comprises a Network Access Identifier (NAI) information and an information bit indicating if the UE can simultaneously access both the mobile communication network and the wireless LAN.

* * * * *